United States Patent Office 3,384,600
Patented May 21, 1968

3,384,600
NOVEL COMPOSITIONS AND THEIR USE IN PREVENTING AND INHIBITING FOAM
Elemer Domba, Olympic Fields, Ill., assignor to Nalco Chemical Company, Chicago, Ill., a corporation of Delaware
No Drawing. Filed Nov. 20, 1964, Ser. No. 413,399
2 Claims. (Cl. 252—358)

ABSTRACT OF THE DISCLOSURE

This invention concerns new compositions characterized as having low foaming activity. The compositions comprise hydrocarbons which normally tend to foam and cyanoethoxyalkoxypolysiloxane oligomers.

---

This invention is concerned with new compositions and their use in inhibiting and preventing foaming problems. More particularly, the instant invention relates to modified alkoxypolysiloxane compositions, particularly valuable in inhibiting and preventing foaming of hydrocarbons It is known that hydrocarbon systems are susceptible to foaming problems even under mild conditions of agitation. Thus, hydrocarbon-based compositions tend to foam or froth when agitated in the presence of gases or vapors such as air, steam, etc., or when merely mechanically agitated by transfer from one vessel to another or by other types of mechanical movements. In such instances foam creation becomes a substantial drawback in not allowing full utilization of the particular equipment involved. Also, during many situations when a hydrocarbon material is being processed in some manner, operating conditions are so altered by foam that considerable interference with the process itself is caused, with resultant low capacity and considerable economic loss.

More specifically, when a hydrocarbon-based material, such as a fuel oil or gasoline, is being transferred from one vessel to another, such as by pumping means, considerable liquid agitation occurs and substantial quantities of foam are simultaneously produced. As a consequence, the transfer operation itself may require an inordinate and excessive amount of time before filling the vessel to which hydrocarbon is being transferred. That is, after partial addition of hydrocarbon to transfer vessel the created foam must be allowed to reach a state of quiescence before additional hydrocarbon is introduced. Otherwise, the hydrocarbon material will overflow the vessel into which it is being introduced in form of foam.

The above-described problem is particularly prevalent when hydrocarbons such as fuel oils or gasoline are being pumped from a holding tank into a tank truck. In such an operation as much as one-third of the volume of the truck may be occupied with foam if steps are not taken to combat this problem. In some severe conditions, the volume of foam or froth produced is many times that of the original hydrocarbon.

In summary, in preparing and using hydrocarbon compositions commercially and domestically, they are often subjected to agitation under a wide range of conditions producing undesirable amounts of foam or froth. Such a problem must necessarily be obviated in order to effect efficient transfer or processing of such hydrocarbon materials.

Various methods of combating such foaming of hydrocarbon compositions have been proposed. As an example, mechanical devices have been used to destroy or break foam as it is formed. Usually such devices have been cumbersome and/or inefficient and they are not generally employed. Likewise, introduction of certain chemical antifoam agents into hydrocarbon has been proposed as a means of preventing foam and collapsing already-formed foam. Such prior art antifoam additives are often of low effectiveness. In some instances, these substances break down chemically and physically and the products of degradation may either debilitate the parent active component or cause foaming problems due to the own foam-encouraging properties. In other cases the defoaming or foam-inhibiting substances must be employed in relatively large amounts to give effective control, or else cause difficult process control problems because they are ineffective unless added in certain critical amounts. Lastly, some proposed defoaming additives are only effective in certain hydrocarbon media, and cannot be usefully employed in a variety of other hydrocarbon-based materials.

It would therefore be a substantial advance in the antifoaming art if a single substance could be found which is relatively general in its application to hydrocarbon materials, has good chemical and physical stability, excellent dispersibility or solubility in the hydrocarbon environment to be treated, and yet need only be applied in relatively low amounts to give effective antifoam control. It would be an extreme advantage to the art if an antifoam substance could be discovered which may be usefully employed in particularly troublesome hydrocarbon systems such as fuel oils and gasolines which have a strong tendency to foam even under mild conditions of agitation. This is particularly true if the just-mentioned hydrocarbon materials contain additional agents, such as soaps, fatty oils, sulfurized fatty oils, sulfur or chlorine compounds, metallic derivatives, etc., which normally tend to promote foaming, particularly under conditions of agitation in which large volumes of air are introduced into the hydrocarbon material, such as is caused by pumping.

It therefore becomes an object of the invention to provide stable, hydrocarbon-dispersible antifoam compounds which have rather general application in a wide variety of hydrocarbon media without recourse to other antifoam aids.

Another object of the invention is to provide novel compositions of matter which may be used to defoam and inhibit foam arising in hydrocarbon systems such as fuel oils and gasoline.

A specific object of the invention is to provide specially modified polysiloxane compounds which may be used to combat foam problems in hydrocarbon systems particularly susceptible to foaming such as gasolines, fuel oils, lubricants, etc.

Other objects will appear hereinafter.

In accordance with the invention, a novel class of polysiloxane compounds has been discovered which is admirably suited for use in defoaming and foam inhibition activities. These new compounds may be used as antifoam agents without resort to combination with other ingredients and may be used in a wide variety of hydrocarbon materials which are being processed or transferred and are thus particularly susceptible to foaming during such durations of time. In general, the antifoam compositions of the invention may be generically referred to as cyanoethoxyalkoxysiloxane oligomers. These antifoam products find particular use as defoaming agents, that is in abating a system already in a foaming state. As a secondary role, the products of the invention are also useful in inhibiting or preventing foaming before such a condition occurs. Both roles, may of course, be performed simultaneously.

By far the most preferred compositions of the invention have the following general structural formula:

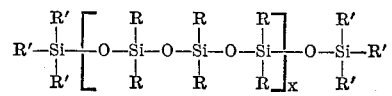

where R is selected from the group consisting of

CN—CH₂CH₂O— and R' and R' is selected from the group consisting of CH₃CH₂O— and

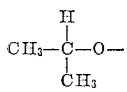

wherein in each occurrence of R the ratio of R' to CNCH₂CH₂O— ranges from about 4:1 to about 1:1, and X is an integer of from about 10 to about 40.

The above shown polymer is formed by reaction of an alkoxypolysiloxane and particularly an ethoxy or isopropoxy-polysiloxane or mixed ethoxy-isopropoxypolysiloxane with hydracrylonitrile. During the reaction a trans-esterification phenomenon occurs wherein some of the ethoxy and/or isopropoxy groups of the polysiloxane are exchanged with the alcoholic group of the hydracrylonitrile whereby cyanoethoxy groups are introduced into the polymer. Upon subsequent heating the cyanoethoxy polymer further condenses to achieve the higher molecular weight materials having repeating units within the range set out above.

The hydracrylonitrile reactant is a well-known chemical and needs little further elaboration. The other reactant used in forming the antifoam compositions of the invention is an alkoxypolysiloxane, that is, a polyethyl or polyisopropylsilicate.

Preferred polysilicate materials are those having an average molecular weight ranging from 300 to 2000 and more preferably from 400 to 1500. These polysilicate reactants are generally derived from controlled hydrolysis of silicon tetrahalides and particularly silicon tetrachloride in aqueous-ethanolic or aqueous-isopropyl alcohol solutions. A mixture of polymeric materials is formed, but the predominant species has the following general formula:

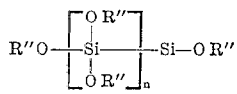

wherein $n$ is an integer ranging from about 4 to about 15 and more often is 4–8 and R'' represents an ethyl or isopropyl group.

In addition, other lower molecular weight polysiloxanes may be present which may be termed, for convenience, hydrolyzate condensation products of the starting silicon tetrahalide reactants. These hydrolyzate condensation products generally contain terminal hydroxyl groups. More preferred polysilicate mixtures therefore have at least 1% of their weight composed of free reactive hydroxyl groups and most preferably at least 2%. A typical silicate polymer has 2–3% of its molecular weight composed of hydroxyls. These reactive hydroxyl-containing compounds are believed to further promote reaction between the hydracrylonitrile and polysilicate compositions represented by the above formula. In effect, these low molecular weight polysiloxanes which contain reactive hydroxyl groups advance further polymerization as well as reaction with the hydracrylonitrile reactant.

Likewise, the above polysilicate starting materials may be defined solely in terms of their available silica content, expressed as SiO₂. In materials of this type, as the extent of polymerization increases, silica content, expressed as SiO₂, likewise proportionally increases. Preferred polysilicates have an available silica content, expressed as SiO₂, ranging from 35% by weight of the overall molecule weight to about 55% by weight. More preferred materials have SiO₂ contents within a range of 35–45%.

Most preferably, the SiO₂ content of the polysilicate reactant ranges from about 38% to about 42% by weight. As a comparison a pure monomeric tetraortho silicate ester has a silica content (SiO₂) of approximately 28% by weight. Thus, by the terms "polyethyl silicate" or "polyisopropyl silicate" or generically "alkoxypolysiloxanes" is meant composition mixtures characterized by the above distinguishing physical and chemical properties which are usually formed by controlled ethanolic or isopropanolic hydrolysis of silicon tetrahalide or similar monomeric derivatives.

A particular preferred starting polysilicate reactant is polyethyl silicate which has been found to be extremely valuable in preparing antifoam compositions of the invention and is sold under the trademark "Ethyl Silicate 40." This compound is a mixture of ethylpolysilicates having about 40% available silica, expressed as SiO₂, and is synthesized from the controlled hydrolysis of tetraethylorthosilicate or tetrachlorosilicon. This polyethyl silicate is generally described as a mixed polymer of ethyl silicate with an average of about 5 silicon atoms per molecule.

One specific source of this material has a specific gravity at 20° C. of 1.0558, a freezing point of —90° C., a viscosity at 20° C. of 3.9 cps. and a refractive index at 20° C. of 1.3965. This particular polymeric substance was derived from the controlled hydrolysis of silicon tetrachloride in presence of 95% ethanol and 5% water.

The antifoam compositions of the invention are prepared by heating the hydracrylonitrile and polysilicate reactants (polyethyl silicate, polyisopropyl silicate, or mixtures thereof) together at temperatures ranging preferably from about 70° C. to about 20° C. The time of heating may be varied over a wide range and preferably is carried out from about 4 to about 16 hours.

In a preferred method of making the antifoamers of the invention, the reactants are heated with stirring at a temperature of about 70° C.–160° C. for 4–8 hours. During this time the transesterification reaction takes place with ethanol or isopropyl alcohol being distilled off. Some minor polymer condensation also takes place during this step.

The above step is continuously followed by further heating the polymer at temperatures ranging from about 120° C.–200° C. for 3–7 hours to complete the polymerization. The step is most preferably effected under a low vacuum. Subatmospheric pressures ranging from about 5 to about 60 mm. Hg are most preferred during this second step.

After the polymerization is completed the reaction is cooled down yielding the final polysilicate product. This product is a 100% active, slightly viscous liquid, free of inactive recrement or diluents, which may be directly employed as an antifoam in protecting the hydrocarbon materials from froth are foam.

Preferred products of the invention may be prepared by reacting from about 8.0% to about 12.0% by weight of hydracrylonitrile and from about 88% to about 96% by weight of the polysilicate reactant, both percentages being based on total reaction mass weight. More preferred reaction masses are composed of 9–11% by weight of hydracrylonitrile and 89–91% by weight of the prepolymerized polysilicate.

The following example is given by way of illustrating a typical preparation of the antifoam compositions of the invention.

Example I 7,200 pounds of "Ethyl Silicate 40," and 800 pounds of hydracrylonitrile were added to a reaction vessel. Heating was begun slowly with efficient stirring. The pot temperature was regulated so that the distillation proceeded smoothly at approximately 80° C. (heat temp.). After approximately six hours heating, the amount of distillate off (ethanol) was approximately 260 pounds, and the pot temperature was 130–140° C. After this time the transesterification was considered essentially completed.

Heating was continued and a vacuum of approximately

25–35 mm. Hg applied. Under this reduced pressure distillate fractions which distilled below 110° C. were removed. The pot temperature was subsequently held at approximately 140–145° C. for about 4–5 hours to complete the polymerization of the already transesterified product.

After completion of the polymerization the reactor was cooled down to a pot temperature of approximately 20–25° C. The specific product, falling within the above listed general structural formula where R' is CH₃CH₂O—, was then cooled and drummed. Excellent antifoam activity was noted with direct use of this product without further incorporation into solvents or modification of any type.

The products of the invention when used as foam inhibitors and foam preventers may be employed directly as such without any further compounding or modification. If desired, however, the reaction products may be dispersed in a wide variety of organic substances and particularly aliphatic hydrocarbon oils such as mineral oil, kerosene, various light aliphatic fuel oils, gas oils, paraffin waxes, and the like. Common organic solvents such as benzene, toluene, carbon tetrachloride, chloroform, etc., may likewise be used as well as polar organic solvents such as alcohols, ketones, etc.

The antifoamers of the invention may be used as such or in solution or dispersed form to treat a wide variety of hydrophobic liquids as hydrocarbons. Such materials as lubricants, light oils, crude oils, fuel oils of various types such as diesel fuels and home burner fuels, gasoline fractions and other hydrocarbon oils or oil-based compositions may be usefully treated with the polysilicate oligomers of the invention. Most preferably, fuel oils and gasolines are treated with the polysilicate products whereby the resultant beneficiated products have little or no tendency to foam under conditions of agitation.

In some instances emulsifying agents, such as polyoxyethylene glycols and polyalkylene glycols, as those marketed under the trade names of "Ucon" and "Carbowax," may be added to the products of the invention or to their formulations in solvents such as aliphatic hydrocarbon oil extenders. Compounds other than emulsifiers and extenders, such as dispersants and the like, may also be added to the compositions of the invention in order to obtain formulated products of the desired physical characteristics.

When used to control and inhibit foaming of hydrocarbon materials addition of as little as one p.p.m. of the compositions of the invention give good foam inhibition and foam prevention. As much as 500 p.p.m. may be used, with the preferred range being between 1 and 100 p.p.m. and the most preferred range being 1–25 p.p.m.

The compounds of the invention are effective over a wide range of pH conditions and under almost any combination of pressure and temperature conditions. In the most preferred practice the compositions of the invention when used as antifoam agents are added directly to the hydrocarbon material being processed, transferred, etc., prior to or during conditions of agitation. If the hydrocarbon material is already in a condition of foaming, the antifoam agents should preferably be added as close as possible to the source of this foam.

In order to determine the effectiveness of the antifoam compositions of the invention the following tests were made.

Example II

In a field trial, oil being pumped from a reservoir to a tank truck was treated with 4–6 p.p.m. of the product of Example I. Under such conditions the fuel oil exhibited no tendency whatsoever to foam. In previous fillings, run in absence of antifoam treatment, as much as ⅓ of the volume of the truck had become filled with foam.

Example III

In this dynamic antifoam test, air was introduced into a No. 2 fuel oil placed in a cylinder having a ½″ inner diameter. The cylinder had a ceramic filter on the bottom and the air was pushed through the filter from the bottom of the cylinder. In absence of antifoam a 200 ml. sample of fuel in 5 seconds time exhibited a condition of 10 cc. of foam. With application of 20–30 p.p.m. of the composition of Example I the produced foam was immediately reduced to a negligible volume.

It is not exactly understood how the compositions of the invention carry out their defoaming role. However, it is believed that application of such materials lowers the interfacial tension and materially alters the surface plasticity of the treated oil material, whereby already produced foam breaks down and reverts to the liquid phase.

The invention, of course, is not limited by the above examples of antifoam use which are meant to be merely illustrative of the type of hydrocarbon media which may be foam controlled by the claimed compositions.

I claim:

1. A composition characterized as having low foaming activity consisting essentially of:
   (a) A hydrocarbon liquid which normally tends to foam and dispersed in said hydrocarbon liquid from 1–500 p.p.m. of,
   (b) a cyanoethoxyalkoxypolysiloxane oligomer having the following structural formula:

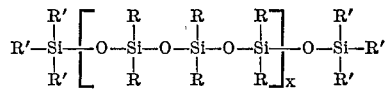

where R is selected from the group consisting of CN—CH₂CH₂O— and R' and R' is selected from the group consisting of CH₃CH₂O— and

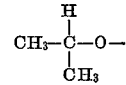

wherein in the occurrences of the R' to

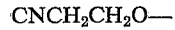

ranges from about 4:1 to about 1:1 and X is an integer of from about 10 to about 40.

2. The composition of claim 1 wherein R' is

References Cited

UNITED STATES PATENTS

| | | | |
|---|---|---|---|
| 2,416,504 | 2/1947 | Trautman et al. | 252—321 X |
| 2,992,083 | 7/1961 | Bluestein et al. | 252—358 X |
| 3,185,663 | 5/1965 | Prober | 252—49.6 X |
| 3,267,042 | 8/1966 | Domba | 252—321 |

LEON D. ROSDOL, *Primary Examiner.*

HERBERT B. GUYNN, *Examiner.*